United States Patent
Faibish et al.

(10) Patent No.: US 11,422,975 B2
(45) Date of Patent: Aug. 23, 2022

(54) COMPRESSING DATA USING DEDUPLICATION-LIKE METHODS

(71) Applicant: EMC IP Holding Company LLC, Hopkinton, MA (US)

(72) Inventors: Sorin Faibish, Newton, MA (US); Ivan Bassov, Brookline, MA (US); Istvan Gonczi, Berkley, MA (US); Philippe Armangau, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 226 days.

(21) Appl. No.: 16/527,508

(22) Filed: Jul. 31, 2019

(65) Prior Publication Data
US 2021/0034575 A1 Feb. 4, 2021

(51) Int. Cl.
*G06F 16/17* (2019.01)
*G06F 16/174* (2019.01)

(52) U.S. Cl.
CPC ...... *G06F 16/1744* (2019.01); *G06F 16/1752* (2019.01)

(58) Field of Classification Search
CPC ............ G06F 16/174; G06F 16/1744; G06F 16/1748; G06F 16/1752; G06F 16/1756
USPC ....................................................... 707/692
See application file for complete search history.

(56) References Cited

U.S. PATENT DOCUMENTS

| | | | |
|---|---|---|---|
| 8,407,193 B2 | 3/2013 | Gruhl et al. | |
| 8,615,500 B1* | 12/2013 | Armangau | G06F 16/1752 707/693 |
| 2008/0162523 A1* | 7/2008 | Kraus | G06F 16/2282 |
| 2009/0234870 A1 | 9/2009 | Bates et al. | |
| 2013/0018932 A1* | 1/2013 | Bhaskar | H03M 7/30 708/203 |
| 2014/0304275 A1* | 10/2014 | Baskett | G06F 16/2255 707/747 |
| 2016/0224520 A1* | 8/2016 | Kataoka | G06F 40/126 |
| 2016/0286008 A1* | 9/2016 | Perez Martinez | H03M 7/3084 |
| 2016/0364180 A1* | 12/2016 | Romanovskiy | G06F 3/0673 |
| 2017/0123689 A1* | 5/2017 | Singhai | G06F 3/0613 |
| 2017/0255643 A1* | 9/2017 | Maheshwari | G06F 16/182 |
| 2018/0329631 A1 | 11/2018 | Swift | |

OTHER PUBLICATIONS

Philippe Armangau, et al.; "Inline Deduplication of Compressed Data," U.S. Appl. No. 14/980,944, filed Dec. 28, 2015.

* cited by examiner

*Primary Examiner* — Hares Jami
(74) *Attorney, Agent, or Firm* — BainwoodHuang (57) ABSTRACT

A technique for performing data reduction applies deduplication principles when performing data compression, providing a form of enhanced compression. The technique obtains a chunk of data that contains multiple extents and applies deduplication actions to identify duplicate extents within the chunk. The technique marks duplicate extents in metadata. Such duplicate extents need not be compressed using conventional data compression, saving computational resources and considerable time.

21 Claims, 8 Drawing Sheets

Metadata
148a

| Index 370 | Uq 372 | Symbol 374 |
|---|---|---|
| 0 | U | X |
| 1 | 0 | X |
| 2 | U | W |
| 3 | U | Y |

COMPRESSING DATA USING DEDUPLICATION-LIKE METHODS

BACKGROUND

Data storage systems are arrangements of hardware and software in which storage processors are coupled to arrays of non-volatile storage devices, such as magnetic disk drives, electronic flash drives, and/or optical drives. The storage processors service storage requests, arriving from host machines ("hosts"), which specify blocks, files, and/or other data elements to be written, read, created, deleted, and so forth. Software running on the storage processors manages incoming storage requests and performs various data processing tasks to organize and secure the data elements on the non-volatile storage devices.

Some data storage systems support data compression and/or deduplication for promoting storage efficiency. Compression works by reducing the size of data sets so that they consume less storage space on disk. Storage systems may perform compression in hardware, in software, or via a mixed hardware/software approach. Deduplication works by replacing redundant data with pointers to a single retained copy (or a smaller number of such copies). In a typical deduplication scheme, a data storage system maintains a database that associates digests (e.g., hash values) of stored data blocks with corresponding pointers to locations of those data blocks in the system. When a new data block arrives or is fetched from disk, the storage system computes a digest of the new data block and attempts to match the digest to one that is already stored in the database. If a match is found, the data storage system configures pointer metadata for the new data block so that it points to the previously-stored data pointed to by the matching entry in the database.

SUMMARY

Existing approaches to data reduction are often inefficient. For example, deduplication can be taxing on memory resources. It is not unusual for a deduplication digest cache to consume many terabytes of volatile memory. In addition, data compression can be expensive in terms of computing demands. Approaches that combine both deduplication and compression can indeed be taxing on storage systems. Thus, there is a need for a more efficient approach to data reduction.

In contrast with prior approaches, an improved technique for performing data reduction applies deduplication principles when performing data compression, providing a form of enhanced compression. The technique obtains a chunk of data that contains multiple extents (e.g., blocks, sectors, and/or other increments of storage) and applies deduplication actions to identify duplicate extents within the chunk. Extents may be 512-byte, or 4 kB or 4 kilobytes, or 8 kB or 8 kilobytes, but are not so limited.

The technique marks duplicate extents in metadata. Such duplicate extents need not be compressed using conventional data compression, saving computational resources and considerable time. In some examples, the scope of deduplication is local to the chunk being processed, such that each chunk forms its own deduplication domain and has its own digest cache. In such arrangements, there is no need to store any digest cache once a chunk has been processed. In some examples, the deduplication domain is itself ephemeral and requires no persistent storage. As a consequence, memory requirements may be sharply reduced.

According to some examples, the technique performs deduplication on extents within a chunk, generating deduplication metadata that reflects the duplicate extents. The technique then computes a compressed dataset from unique data in the chunk. The technique then stores the compressed dataset in association with the metadata.

According to some examples, the technique begins by performing data compression, such as Lempel-Ziv (LZ) compression, starting at one end of a chunk and proceeding toward the other. The technique checks whether a current extent in the chunk matches a previously processed extent within the same chunk, e.g., by hashing and/or directly comparing data. If a match is found, the technique treats the duplicate extent as a repeated symbol (e.g., as an entry in a compression dictionary) and jumps to the next extent. If no match is found, the technique performs data compression on the current extent in the usual manner.

In some examples the technique obtains a chunk and hashes all of its extents. Then the technique identifies unique and duplicate extents and creates metadata that maps duplicate extents to unique extents. The technique concatenates the unique extents to form a dataset, which it compresses using a compression method, such as LZ compression. The compressed dataset is then stored along with the metadata.

In some examples, the technique obtains a chunk of data and obtains an extent from the chunk. The technique computes a hash of the extent and determines whether the hash matches with any prior hashes. If the hash does not match with any prior hashes, then standard compression (such as LZ compression) is performed on the extent, and a new extent is obtained. However, if the hash does match with a prior hash, then standard compression is avoided for that extent, resulting in a substantial improvement in computational efficiency. Instead, the technique may store a reference to the symbol representing the data of the unique extent (e.g., of which current extent is a duplicate).

Advantageously, the disclosed technique improves the efficiency of data compression by applying deduplication principles to extents within a chunk. Comparing extents, either byte-by-byte or using hash values, is typically much faster and simpler than performing compression on extents of the same size. Computationally intensive compression may thus be limited to data found in unique extents, along with any necessary metadata. The scope of extents for which compression is needed can be sharply reduced, improving speed and in many cases improving overall data reduction.

Certain embodiments are directed to a method of managing data storage in a computerized system. The method includes obtaining a chunk of data, where the chunk includes a plurality of extents. The method further includes generating deduplication metadata to reflect duplicate extents of the plurality of extents. The method further includes computing a compressed dataset from the chunk. The compressed dataset includes the deduplication metadata. The method further includes storing the compressed dataset in the computerized system.

Other embodiments are directed to a computerized system constructed and arranged to perform a method of managing data storage, such as the method described above. Still other embodiments are directed to a computer program product. The computer program product stores instructions which, when executed on control circuitry of a computerized system, cause the computerized system to perform a method of managing data storage, such as the method described above.

In some examples, the deduplication metadata identifies the duplicate extents and their locations within the chunk. In some examples, generating the deduplication metadata is performed when computing the compressed dataset. Some examples include storing a dictionary in the compressed dataset, the dictionary including symbols used to perform compression.

In some examples, the deduplication metadata is inserted in the dictionary along with the symbols in the dictionary. In such examples, storing the compressed dataset stores the dictionary that includes the deduplication metadata.

In some examples, computing the compressed dataset for the chunk is performed while or after generating the deduplication metadata. In some examples, computing the compressed dataset uses a compression window that has a size equal to that of an extent. In some examples, the chunk is restored based at least in part on the deduplication metadata.

In some examples, generating deduplication metadata identifies duplicate extents within the chunk and not within other chunks.

In some examples, particular extents within the plurality of extents are compared to identify the duplicate extents and corresponding locations of the duplicate extents. Some examples include identifying the duplicate extents by computing hash digests for the plurality of extents, performing lookups by hash digests, and determining matches between or among the hash digests.

In some examples, an extent of the plurality of extents is any of a sector, a block, and a sub-block. In some examples, the extents that make up the plurality of extents are uniform in size.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

Embodiments of the improved technique will now be described. One should appreciate that such embodiments are provided by way of example to illustrate certain features and principles but are not intended to be limiting.

An improved technique for performing data reduction applies deduplication principles when performing data compression, providing a form of enhanced compression. The technique obtains a chunk of data that contains multiple extents and applies deduplication actions to identify duplicate extents within the chunk. The technique marks duplicate extents in metadata. Such duplicate extents need not be compressed using conventional data compression, saving computational resources and considerable time.

Overview and Structure

Figure 1:
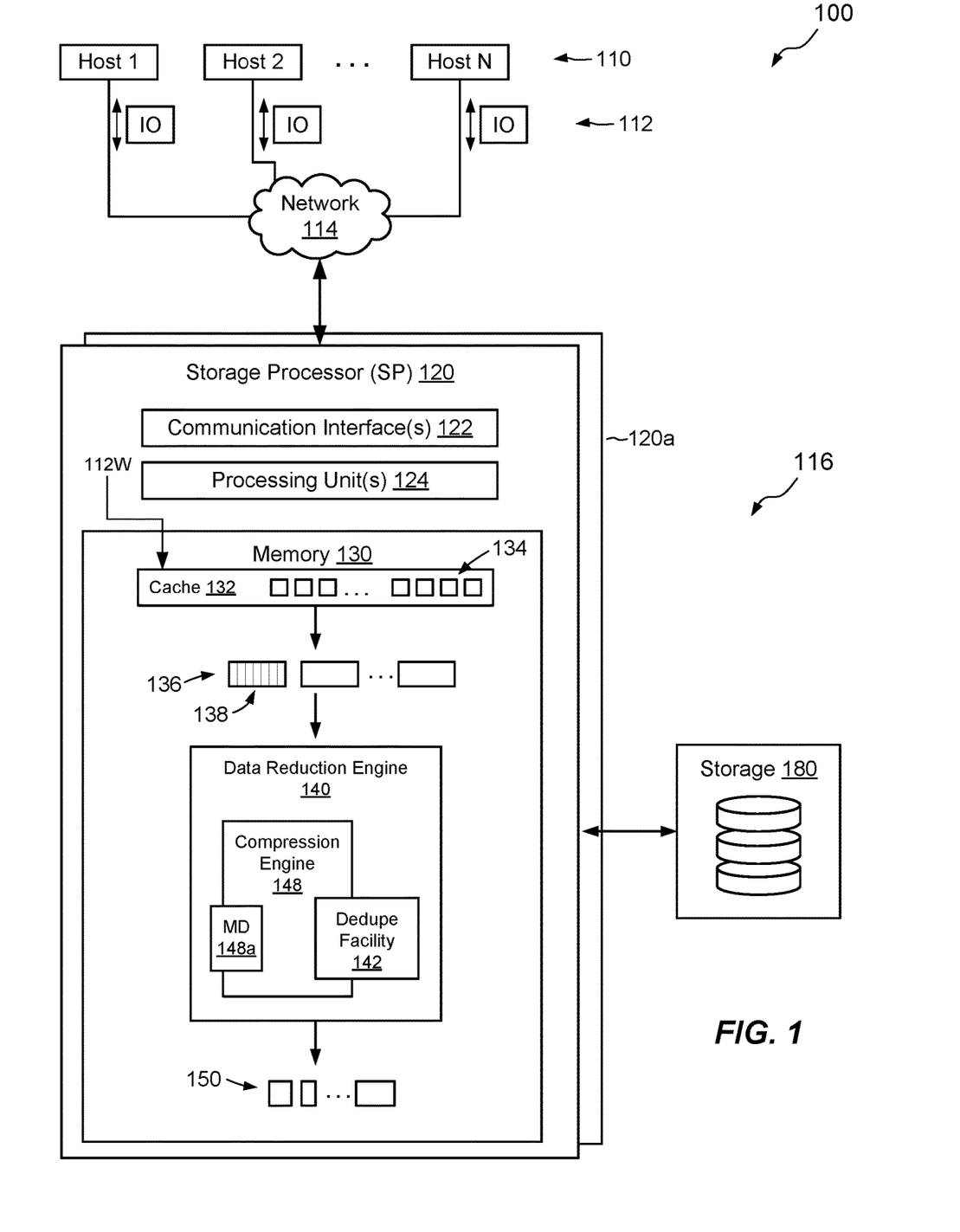
FIG. 1 is a block diagram of an example environment in which embodiments of the improved technique can be practiced.

FIG. 1 shows an example environment 100 in which embodiments of the improved technique can be practiced. Here, multiple hosts 110 access a data storage system 116 over a network 114. The data storage system 116 includes a storage processor, or "SP," 120 and storage 180, such as magnetic disk drives, electronic flash drives, and/or the like. The data storage system 116 may include multiple SPs (e.g., a second SP 120a). For example, multiple SPs may be provided as circuit board assemblies or blades, which plug into a chassis that encloses and cools the SPs. The chassis has a backplane for interconnecting the SPs, and additional connections may be made among SPs using cables. In some examples, the SP 120 is part of a storage cluster, such as one which contains any number of storage appliances, where each appliance includes a pair of SPs connected to shared storage devices. In some arrangements, a host application runs directly on the SP (or SPs), such that separate host machines 110 need not be present. No particular hardware configuration is required, however, as any number of SPs may be provided, including a single SP, in any arrangement, and the SP 120 can be any type of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the SP 120 using various technologies, such as Fibre Channel, iSCSI (Internet small computer system interface), NFS (network file system), and CIFS (common Internet file system), for example. As is known, Fibre Channel and iSCSI are block-based protocols, whereas NFS and CIFS are file-based protocols. The SP 120 is configured to receive I/O requests 112 according to block-based and/or file-based protocols and to respond to such I/O requests 112 by reading or writing the storage 180.

The SP 120 includes one or more communication interfaces 122, a set of processing units 124, and memory 130. The communication interfaces 122 include, for example, SCSI target adapters and/or network interface adapters for converting electronic and/or optical signals received over the network 114 to electronic form for use by the SP 120. The set of processing units 124 includes one or more processing chips and/or assemblies, such as numerous multicore CPUs (central processing units). The memory 130 includes both volatile memory, e.g., RAM (Random Access Memory), and non-volatile memory, such as one or more ROMs (Read-Only Memories), disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions, a cache 132 and a data reduction engine 140. The data reduction engine 140 includes a deduplication ("dedupe") engine 142, a compression engine 148, a dedupe facility 142, and deduplication metadata 148a. The cache 132 is configured to receive host data, i.e., data being written to the data storage system 116 by hosts 110, and to temporarily store the host data until it can be placed in more permanent structures. In some examples, the cache 132 is a persistent cache, such as one constructed from battery-backed and/or mirrored DRAM (Dynamic Random Access Memory). This is not required, however.

The cache 132 may arrange host data in block-sized increments, or simply "blocks" 134, where a "block" is a logical unit of storage. In the illustrated example, a block is also an allocation unit used by the storage system, although this is not required. Blocks may be uniform in size, with 4-kB or 8-kB block sizes being common. Some storage systems support multiple block sizes.

In example operation, write requests 112W arrive at the data storage system 116 and the cache 132 stores the specified data in blocks 134. The cache 132 may then transmit the blocks 134 to the data reduction engine 140 as chunks 136. Each chunk 136 may include multiple blocks 134. Within each chunk 136, data of the blocks 134 are referred to herein as extents 138. The extents 138 may be the same size as the blocks 134 or they may be of different sizes. For example, an extent may be a sub-block (fraction of a block) or a sector (e.g., 512 bytes).

As further shown in FIG. 1, the data reduction engine 140 is configured to receive chunks 136 and perform data reduction to compute compressed datasets 150. The compression engine 148 is communicatively coupled to a deduplication (or "dedupe") facility 142 configured to perform deduplication operations, or deduplication-like operations, as described herein. The deduplication operations may generate deduplication metadata 148a. After the data reduction engine 148 has created each compressed dataset 150, the SP 120 may write the compressed dataset 150 to storage 180 along with the deduplication metadata 148a, as described further to follow.

In the context of FIG. 1, FIGS. 2A-C show a sequence of data reduction operations, according to some examples.

Figure 2A:
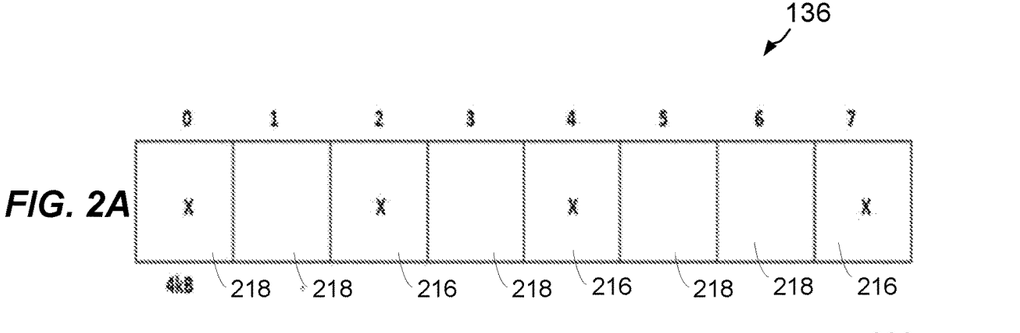
FIGS. 2A-C are diagrams that show an example sequence of data reduction operations.

FIG. 2A shows a chunk 136 with extents 0-7. A chunk 136 may have multiple extents, and is not limited to only having extents 0-7. Each of the extents 0-7 have either unique data 218 or duplicate data 216. Extents may be 512-byte, or 4 kB or 4 kilobytes, or 8 kB or 8 kilobytes, but are not so limited.

The storage processor 120 may perform a search on a chunk 136 to identify and store which extents are duplicates 216 and which extents are unique 218. In some examples, the search may be focused on small 4-Mega-byte (4 MB) or smaller data chunks, but data chunk sizes of the search are not so limited. The result of the search is that the duplicate extents 216 and their corresponding locations (referring to locations 2, 4, and 7 of FIGS. 2A-C) are identified for removal from the chunk 136.

Figure 2B:
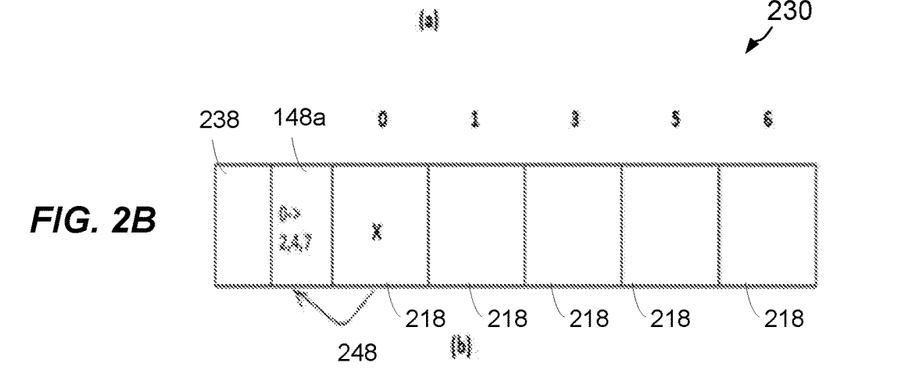

FIG. 2B shows a partial chunk 230 that includes extents 0, 1, 3, 5, and 6, as well as metadata 148a, and a dictionary 238. As illustrated in FIG. 2B, the duplicate extents 216 are extracted from the chunk 136 in order to form the partial chunk. The metadata 148a includes references to the unique extents 218 and the duplicate extents 216. The partial chunk 230 may then have a dictionary 238 included within the partial chunk 230 or a header thereof.

Figure 2C:
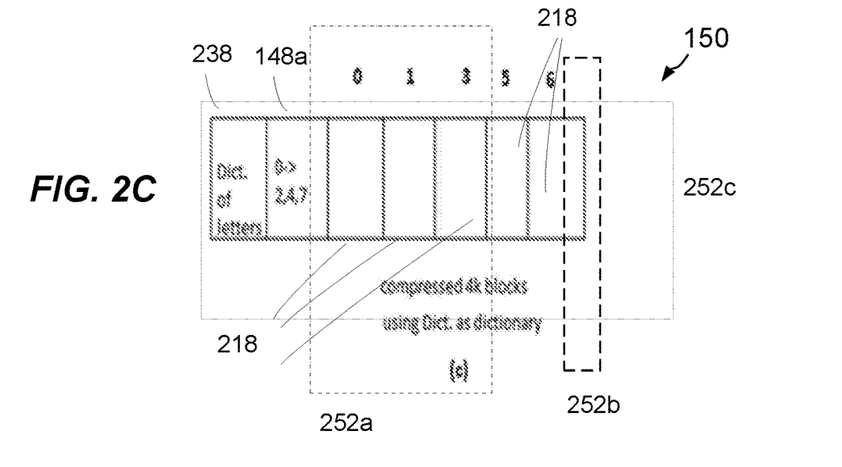

FIG. 2C shows a compressed chunk 150 that is compressed using a compression window (one or more of 252a, 252b, 252c, respectively). The storage processor 120 compresses the partial chunk 230 to form the compressed chunk 150 using one or more of the compression windows (one or more of 252a, 252b, 252c, respectively). To perform the compression, compression methods known in the art may be employed, including but not limited to the Lempel-Ziv (LZ) method.

These compression methods most commonly build a dictionary of byte sequences that are similar to letters in an alphabet. The "alphabet" may include a sequence of characters, numbers, or other "symbols" such as computer keyboard characters, but the alphabet is not so limited. The "dictionary" is a set of symbols created for byte sequences encountered in the data as it is encoded.

The compression methods, such as LZ compression, then use the dictionary symbols created based on alphabet characters to compare dynamically (e.g., in real-time) against received encoded data to determine if a match occurs to the data with a symbol in the dictionary. If a symbol in the dictionary matches with the received encoded data (having one or more alphabet characters or numbers), then compression is performed using the symbol.

In some examples, the deduplication metadata 148a identifies the duplicate extents 216 and their locations within the chunk 136. In some examples, generating the deduplication metadata 148a is performed when computing the compressed dataset 150. In some examples, generating the deduplication metadata 148a and computing the compressed dataset 150 are performed as part of a data reduction operation.

Some examples include storing a dictionary 238 in the compressed dataset 150, the dictionary including symbols 374 used to perform compression.

Some examples include inserting the deduplication metadata 148a in a dictionary 238 along with symbols 374 in the dictionary 238. In such examples, storing the compressed dataset 150 stores the dictionary 238 that includes the deduplication metadata 148a. In some examples, the deduplication metadata 148a or one or more references thereto 248 are added to the dictionary 238.

In some examples, computing the compressed dataset 150 for the chunk 136 is performed (i) while, or (ii) after generating the deduplication metadata 148a. Computing (i) "while" means performing hash matching while advancing through data during compression, whereas (ii) "after" means performing the hashes first, then identifying the duplicate and unique data, and then compressing the unique data.

Some examples include restoring the data chunk 136 after it is compressed 150 based at least in part on the deduplication metadata 148a or a reference thereto 248. In some examples, generating deduplication metadata 148a identifies duplicate extents 216 within the chunk 136 and not within other chunks.

In some examples, particular extents 216, 218 within the plurality of extents are compared to identify the duplicate extents 216 and corresponding locations of the duplicate extents. Some examples include identifying the duplicate extents 216 by computing hash digests (referring to FIG. 1, deduplication facility 142) for the plurality of extents and performing lookups by hash digests and determining matches between or among the hash digests.

Figure 3:
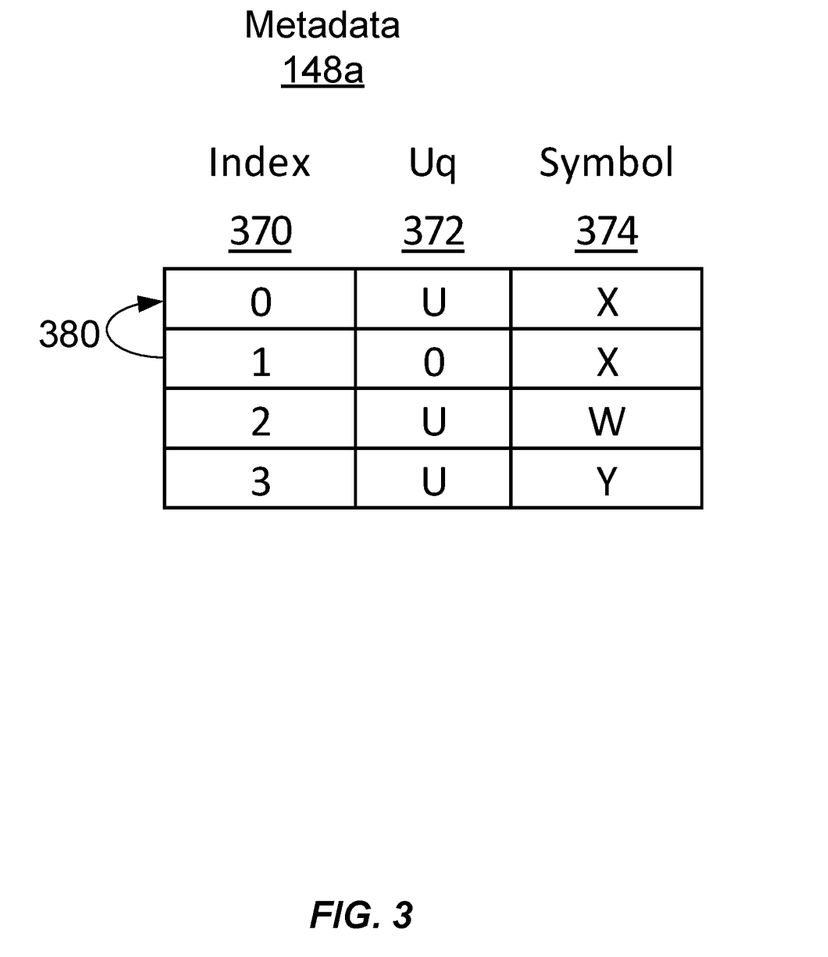
FIG. 3 is a block diagram of the example metadata structures of FIGS. 2A-2C, after a deduplication operation has been performed.

FIG. 3 is a table that shows an example of the metadata structures 148a of FIGS. 2A-C, after a deduplication operation has been performed. A reference or pointer 380 is illustrated which may determine whether extents 138 are unique or redundant. Corresponding indices 370, and corresponding symbols 374 that may include alphabet characters, but are not so limited, may be included in the metadata 148a. As illustrated by column 372 in FIG. 3, the metadata 148a may represent extents 138 that are unique (shown as "U" in column 372) or extents 138 that are duplicates (or redundant, shown with corresponding index value in column 372, such as "0" for index 0). The metadata 148a is used to reference 380 duplicates to the unique extents, in order to more compactly represent data in a form with reduced (or eliminated) duplication.

Write Operation

Figure 4:
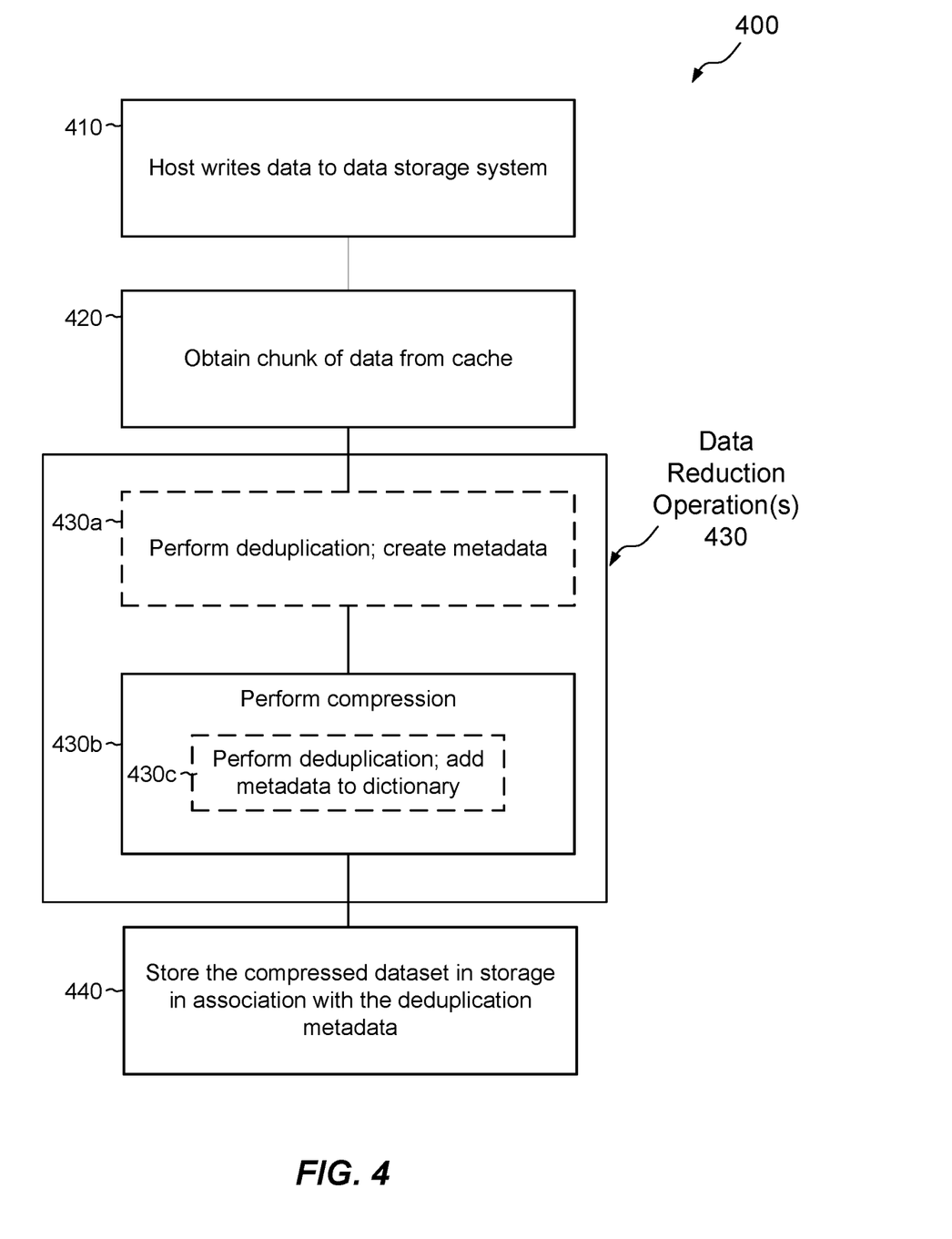
FIG. 4 is a flowchart of a write operation in the context of FIGS. 1-3.

FIG. 4 is a flow diagram of a write operation 400 in the context of FIGS. 1-3. At 410, a host 110 may write data to the data storage system 116. At 420, the storage processor 120 may select (or form, obtain, etc.) a chunk 136 from the cache memory 132 (or alternatively from data storage 180). The chunk 136 may include multiple extents 138. In a non-limiting example, a chunk 136 may be 4 MB in size.

Now that a chunk 136 has been selected, data reduction operations 430 may be performed on the chunk 136, performing deduplication either sequentially 430a, or in parallel 430c, or both sequentially 430a and in parallel 430c, with respect to compression 430b. The sequential 430a and parallel 430c deduplication operations are described further in detail to follow in FIG. 7, and FIG. 8, respectively.

At 430, the deduplication 430a and/or 430c may be performed on the chunk 136 by deduplication facility 142 as illustrated previously in reference to FIGS. 2A-C. As collectively illustrated in FIGS. 2A-C, duplicates 216 may be identified and represented by a metadata pointer 148a that points to the duplicates 216.

Duplicate extents are then removed (in one or more of 430a and 430c) from the original chunk 136 to form a partial chunk 230 having the unique extents. The partial chunk 230 with unique extents includes the metadata 148a. A corresponding lookup dictionary 238 is added to the partial chunk 230. Then, the partial chunk 230 is compressed (430b) to form a compressed chunk 150 which is then stored (440) in storage 180.

Read Operation

Figure 5:
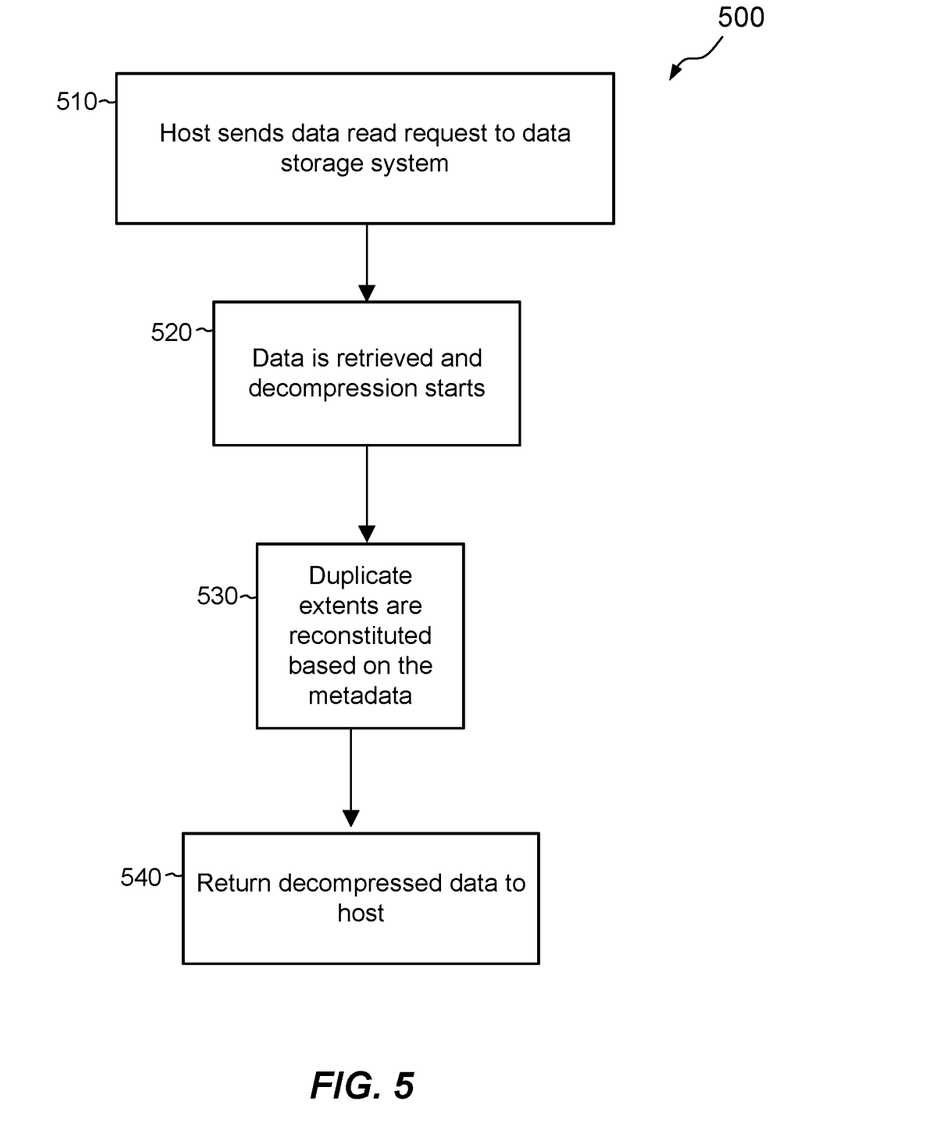
FIG. 5 is a flowchart of a read operation in the context of FIGS. 1-3.

FIG. 5 is a flow diagram of a read operation 500 in the context of FIGS. 1-3 to retrieve and restore a compressed dataset. At 510, a host may perform a data read request to the data storage system to request data stored in a chunk 136. At 520, the data is retrieved, e.g., from storage 180, and the decompression procedure begins. As part of decompression, which may be performed using the LZ method or any other known decompression method, duplicate extents are reconstituted from their respective unique extents based on the metadata (530). Then, at 530 the decompressed data is returned to the host.

Example Methods

Figure 6:
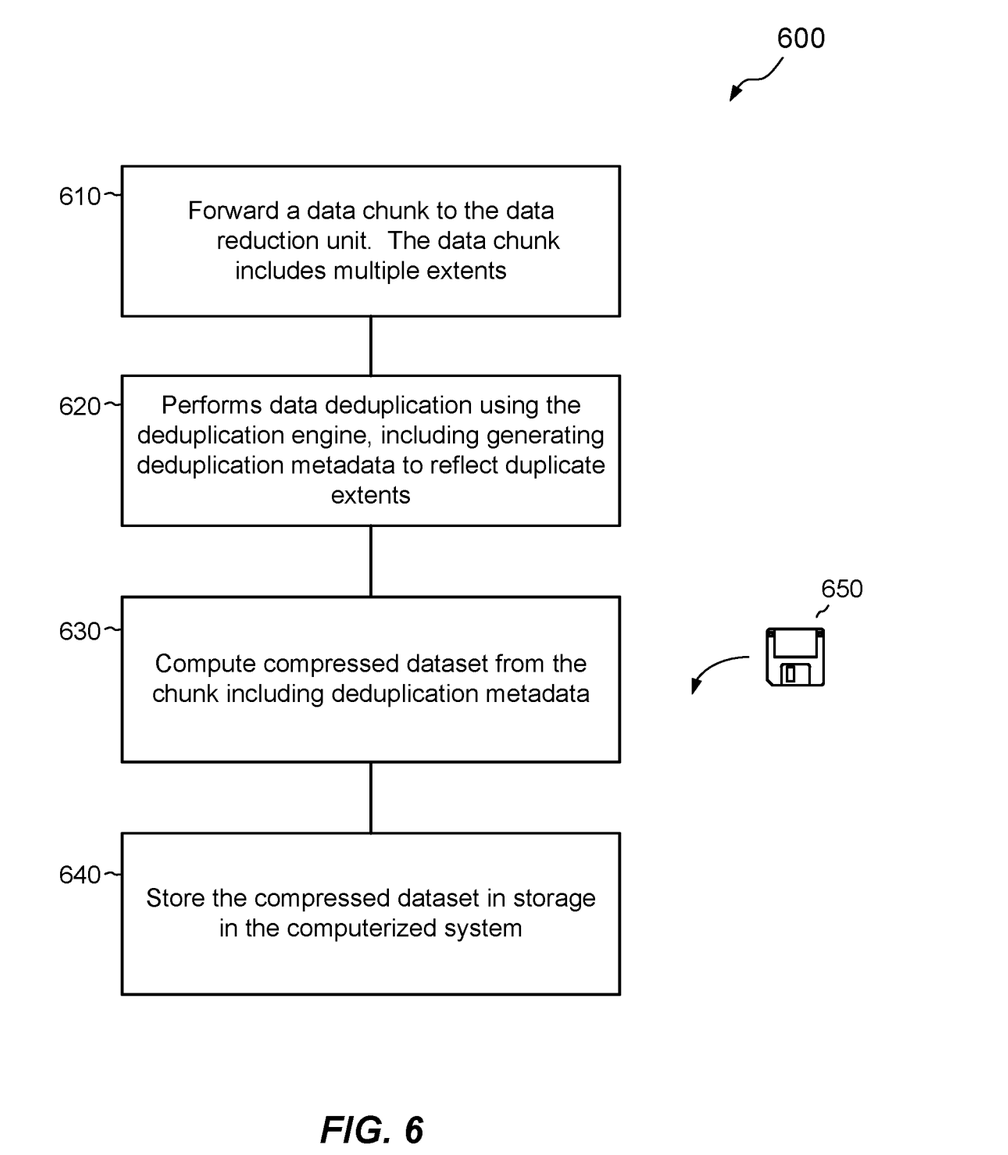
FIG. 6 is a flowchart showing an example method of managing data storage.
Figure 7:
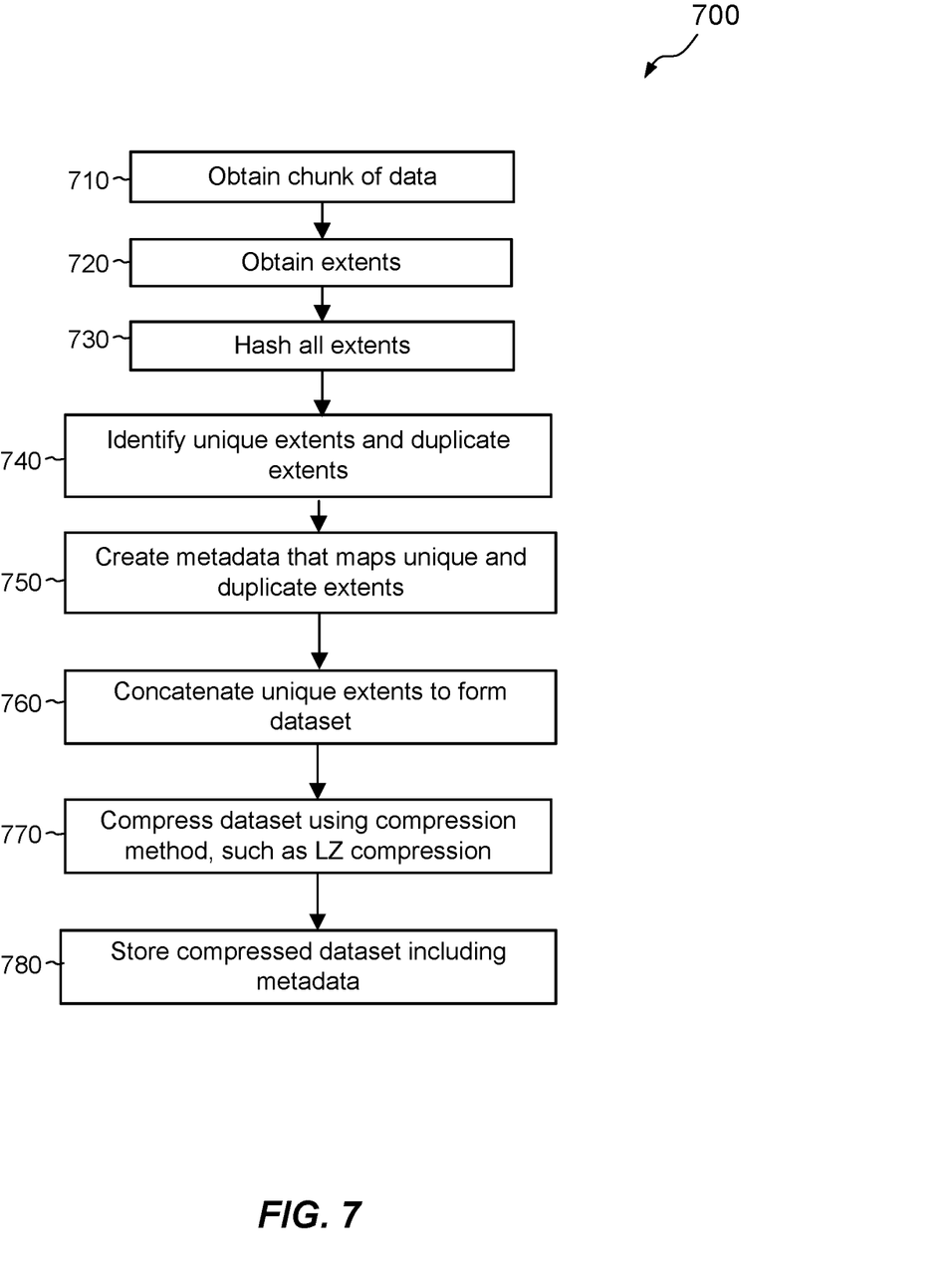
FIG. 7 is a flowchart showing an example method in which deduplication operations are performed sequentially before compression operations.
Figure 8:
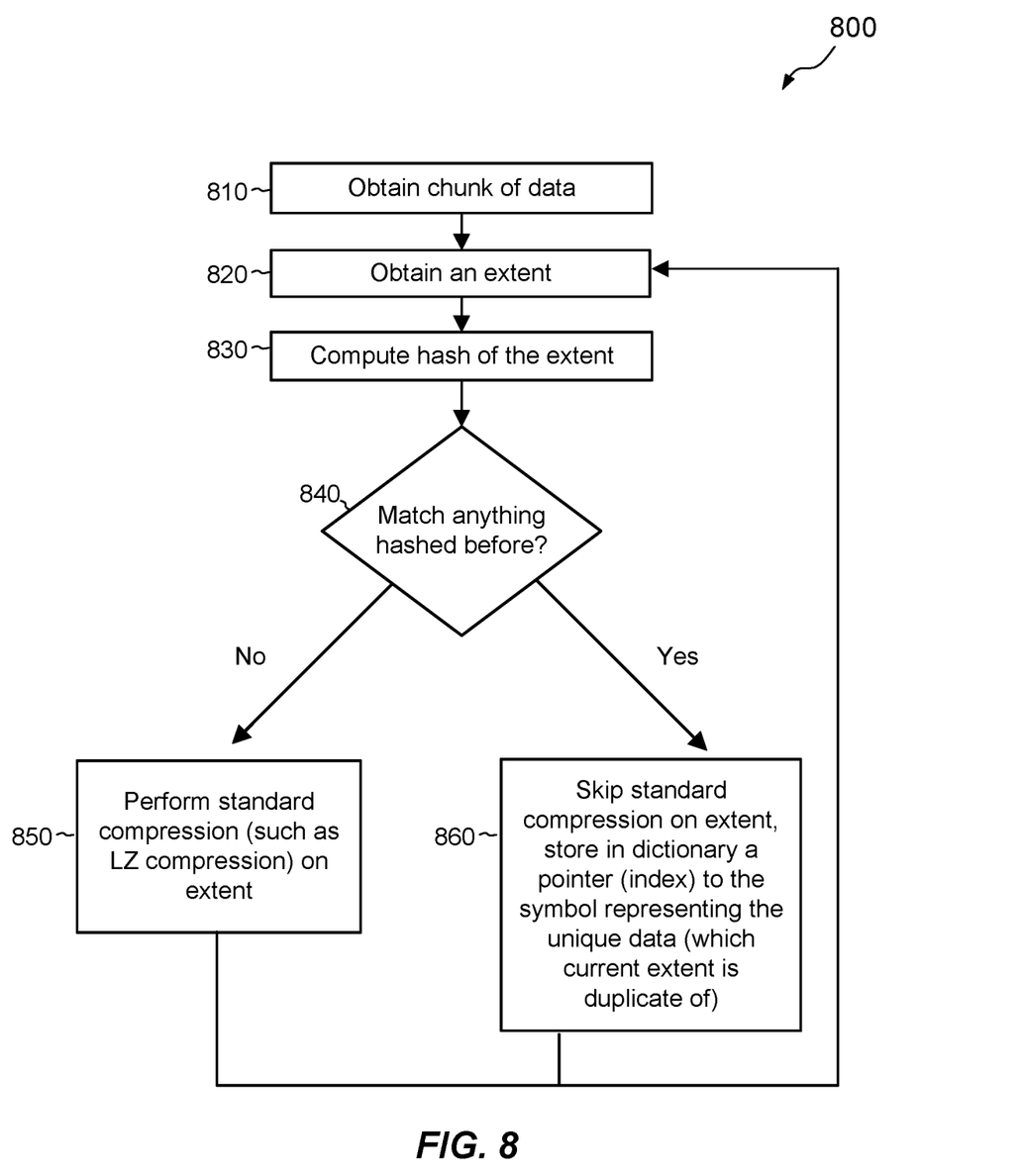
FIG. 8 is a flowchart showing an example method in which deduplication operations are performed in parallel with compression operations.

FIGS. 6-8 show example methods 600, 700, and 800 that may be carried out in connection with the environment 100. The methods 600, 700, and 800 are typically performed, for example, by the software constructs described in connection with FIGS. 1-5, which reside in the memory 130 of the storage processor 120 and are run by the set of processing units 124. The various acts of methods 600, 700, and 800 may be ordered in any suitable way. Accordingly, embodiments may be constructed in which acts are performed in orders different from those illustrated, which may include performing some acts simultaneously.

FIG. 6 is a flowchart showing a general example method 600.

At 610, SP 120 forwards a data chunk 136 to the data reduction engine 140. The data chunk includes multiple extents 138, such as hundreds or thousands of extents, for example.

At 620, SP 120 performs data deduplication using the deduplication facility 142, including generating deduplication metadata 148a to reflect duplicate extents of at least two extents 138.

At 630, the SP 120 computes a compressed dataset 150 from the chunk 136. The compressed dataset 150 includes the deduplication metadata 148a.

At 640, SP 120 stores the compressed dataset 150 in the data storage system 116. The SP 120 may store the compressed dataset 150 in storage 180 or elsewhere in the system 116.

FIG. 7 is a flowchart showing an example method 700 in which deduplication operations are performed sequentially, before compression operations.

At 710, SP 120 forms a data chunk 136. At 720, SP 120 obtains extents 138 from the data chunk 136. At 730, SP 120 hashes all of the extents 138 that are obtained.

At 740, SP 120 identifies unique extents and duplicate extents of the chunk. At 750, SP 120 creates metadata 148a that maps the duplicate extents to the unique extents. At 760, SP 120 concatenates the unique extents to form a dataset for compression.

At 770, SP 120 compresses the dataset using a compression method, such as LZ compression. At 780, SP 120 stores the compressed dataset 150 including metadata 148a.

FIG. 8 is a flowchart showing an example method 800 in which deduplication operations are performed in parallel with compression operations.

At 810, SP 120 obtains or forms a data chunk 136. At 820, SP 120 obtains an extent 138 from the chunk 136. At 830, SP 120 computes a hash of the extent 138.

At 840, a check is performed to determine whether the hash matches with any prior hashes computed for the current chunk 136.

If the hash does not match with prior hashes, then at 850, standard compression (such as LZ compression) is performed on the extent, and a new extent is obtained at next step 820.

However, if the hash matches with a prior hash, then at 860, standard compression (such as LZ compression) is avoided on the extent, resulting in a substantial computational efficiency improvement. Instead, at 860, the SP 120 stores in the dictionary a pointer (index) or other reference to the symbol representing the data of the unique extent (e.g., of which the current extent is a duplicate). The symbol is then used in the dictionary to perform compression, and a new extent is obtained at next step 820.

After compression and storage in any of FIGS. 6-8, the compressed dataset 150 can be restored using the read and restore method of FIG. 5.

Having described certain embodiments, numerous alternative embodiments or variations can be made. For example, although certain sizes of chunks 136 and extents 138 have been shown and described, these are merely examples, as the disclosure is not limited in this manner.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 650 in FIG. 6). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, the terms "based on" and "based upon" should be interpreted as meaning "based at least in part on" or "based at least in part upon," as bases need not be exclusive unless explicitly stated. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of managing data storage in a computerized system, the method comprising:
   receiving specified data into a cache in response to write requests;
   obtaining a chunk of data from the specified data in the cache, the chunk including a plurality of extents, the plurality of extents including unique extents and duplicate extents and forming a local deduplication domain limited to the plurality of extents;
   generating deduplication metadata to reflect the duplicate extents of the plurality of extents within the local deduplication domain;
   computing a compressed dataset from the chunk, the compressed dataset including compressed versions of the unique extents and a dictionary that includes both (i) compression symbols used for compressing the unique extents and (ii) the deduplication metadata that reflects the duplicate extents; and
   storing the compressed dataset in the computerized system.

2. The method of claim 1, wherein the deduplication metadata identifies the duplicate extents and their locations within the chunk.

3. The method of claim 2, wherein generating the deduplication metadata is performed when computing the compressed dataset.

4. The method of claim 1, wherein computing the compressed dataset for the chunk is performed while or after generating the deduplication metadata.

5. The method of claim 1, wherein computing the compressed dataset uses a compression window that has a compression size smaller than any respective size of any extent of the unique extents.

6. The method of claim 1, further comprising restoring the chunk based at least in part on the deduplication metadata.

7. The method of claim 1, wherein generating deduplication metadata identifies duplicate extents within the chunk and not within other chunks.

8. The method of claim 1, further comprising:
   comparing particular extents within the plurality of extents to identify the duplicate extents and corresponding locations of the duplicate extents.

9. The method of claim 1, further comprising identifying the duplicate extents by computing hash digests for the plurality of extents and performing lookups by hash digests and determining matches between or among the hash digests.

10. The method of claim 1, wherein each extent of the plurality of extents is any of a sector, a block, and a sub-block.

11. The method of claim 1, wherein the plurality of extents are uniform in size.

12. The method of claim 1, wherein the chunk has its own deduplication cache whose entries are limited to the plurality of extents, and wherein the deduplication cache is not persistently stored.

13. The method of claim 1, wherein the computerized system processes the plurality of extents extent-by-extent in an order such that, for each current extent, the computerized system performs compression on the current extent responsive to determining that the current extent is a unique extent, and the computerized systems performs deduplication on the current extent responsive to determining that the current extent is a duplicate extent.

14. The method of claim 1, wherein the computerized system identifies duplicate extents as extents that match a previously processed extent in the chunk of data, and wherein the computerized system identifies unique extents as extents that do not match any previously processed extent in the chunk of data.

15. A computerized system, comprising control circuitry that includes a set of processing units coupled to memory, the control circuitry constructed and arranged to:
    receive specified data into a cache in response to write requests;
    obtain a chunk of data from the specified data in the cache, the chunk including a plurality of extents, the plurality of extents including unique extents and duplicate extents and forming a local deduplication domain limited to the plurality of extents;
    generate deduplication metadata to reflect the duplicate extents of the plurality of extents within the local deduplication domain;
    compute a compressed dataset from the chunk, the compressed dataset including compressed versions of the unique extents and a dictionary that includes both (i) compression symbols used for compressing the unique extents and (ii) the deduplication metadata that reflects the duplicate extents; and
    store the compressed dataset in the computerized system.

16. The system of claim 15, wherein the deduplication metadata identifies the duplicate extents and their locations within the chunk.

17. The system of claim 16, the control circuitry being further constructed and further arranged to generate the deduplication metadata when computing the compressed dataset.

18. The system of claim 17, the control circuitry being further constructed and further arranged to store a dictionary in the compressed dataset, the dictionary including symbols used to perform compression.

19. A computer program product including a set of non-transitory, computer-readable media having instructions which, when executed by control circuitry of a computerized system, cause the control circuitry to perform a method of managing data storage, the method comprising:
    receiving specified data into a cache in response to write requests;
    obtaining a chunk of data from the specified data in the cache, the chunk including a plurality of extents, the plurality of extents forming a local deduplication domain limited to the plurality of extents;
    generating deduplication metadata to reflect the duplicate extents of the plurality of extents within the local deduplication domain;
    computing a compressed dataset from the chunk, the compressed dataset including compressed versions of the unique extents and a dictionary that includes both (i) compression symbols used for compressing the unique extents and (ii) the deduplication metadata that reflects the duplicate extents; and
    storing the compressed dataset in the computerized system.

20. The computer program product of claim 19, wherein the deduplication metadata identifies the duplicate extents and their locations within the chunk.

21. The computer program product of claim 20, wherein generating the deduplication metadata is performed when computing the compressed dataset.

* * * * *